Figures 1, 4:
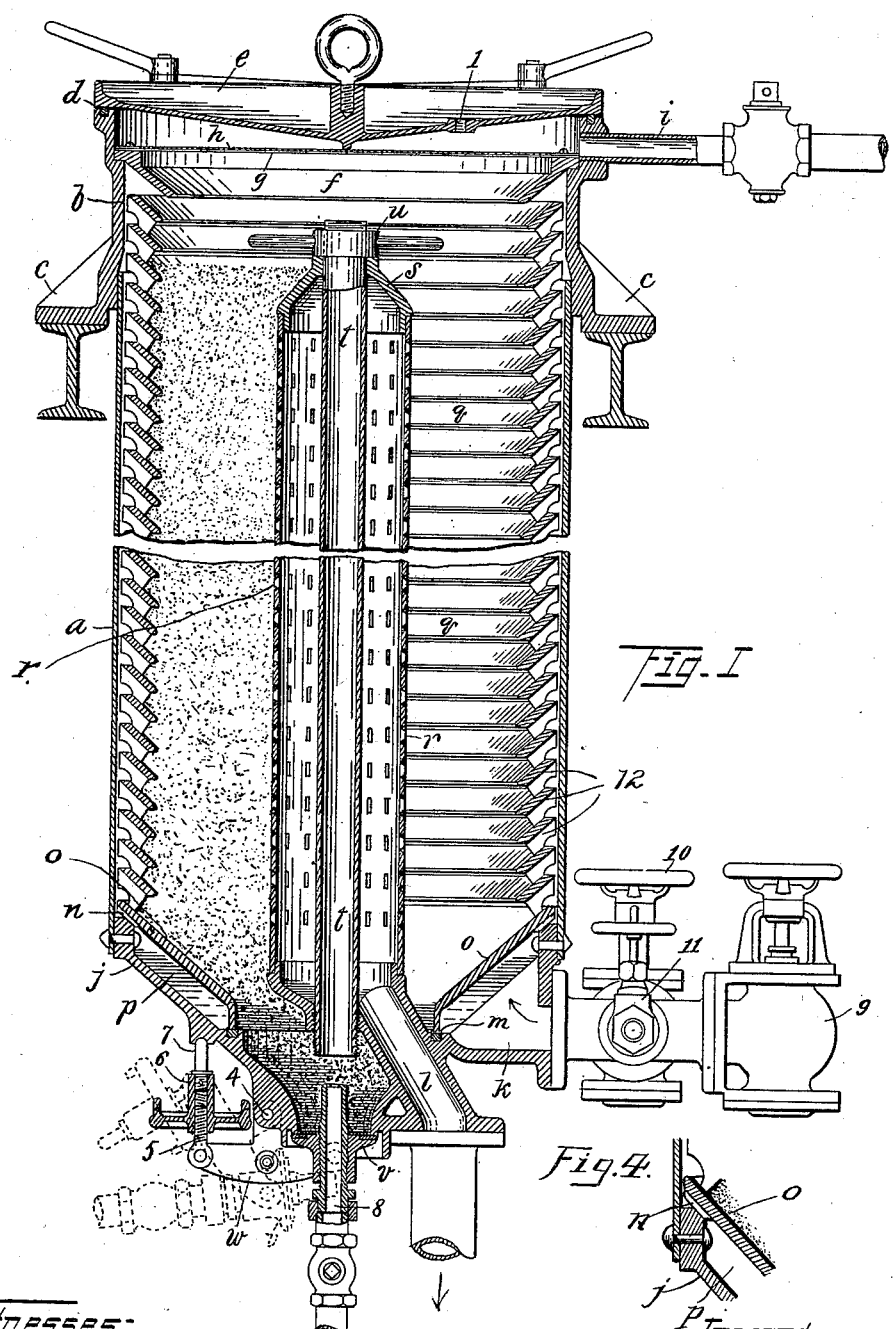

No. 668,441. Patented Feb. 19, 1901.
E. F. DYER.
SAND FILTER.
(Application filed Oct. 8, 1900.)
(No Model.) 2 Sheets—Sheet 1.

Witnesses:
Inventor.
Edward F. Dyer,
by
Luther G. Hopper,
Attorney.

No. 668,441. Patented Feb. 19, 1901.
E. F. DYER.
SAND FILTER.
(Application filed Oct. 8, 1900.)
(No Model.) 2 Sheets—Sheet 2.
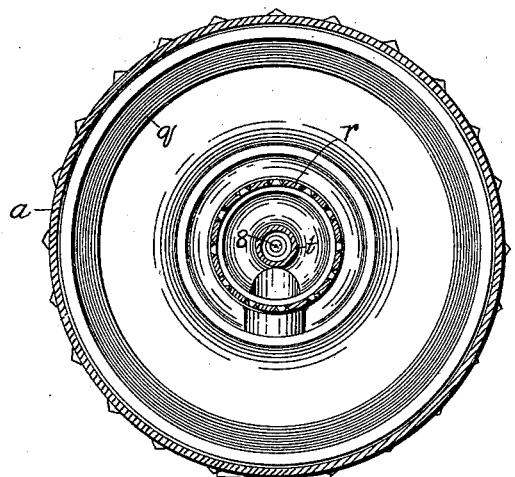
Fig. II
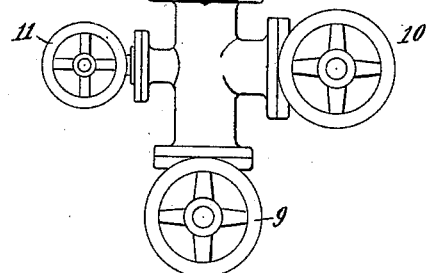
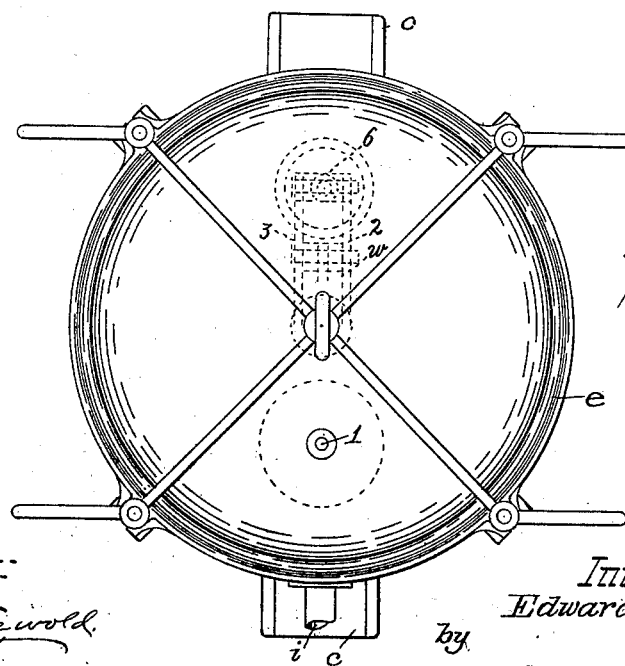
Fig. III
Witnesses:
F. Griswold
F. H. Moyer
Inventor:
Edward F. Dyer,
by
Luther G. Hopper,
Attorney.

UNITED STATES PATENT OFFICE.

EDWARD F. DYER, OF CLEVELAND, OHIO, ASSIGNOR TO E. H. DYER & CO., OF SAME PLACE.

SAND FILTER.

SPECIFICATION forming part of Letters Patent No. 668,441, dated February 19, 1901.

Application filed October 8, 1900. Serial No. 32,331. (No model.)

*To all whom it may concern:*

Be it known that I, EDWARD F. DYER, a citizen of the United States, residing at Cleveland, in the county of Cuyahoga and State of Ohio, have invented certain new and useful Improvements in Sand Filters, of which the following is a specification.

My invention relates to improvements in filters containing a compact body of sand or other suitable substance for the purpose of catching and holding the solid impurities contained in liquids percolating therethrough, and is especially adapted to large filters of such class employed in factories for filtering various fluids—as, for instance, saccharine solutions in a sugar factory.

The object of this invention is to provide ready, effective, and convenient means for separating the impurities from the filtering material, comprising a novel arrangement adapted to violently agitate the said material during the process of washing out the filter, thereby bringing each particle of the filtering substance into contact with a jet of water to insure a thorough cleansing thereof, together with such minor objects as will become apparent from the description and be set forth in the claims.

To these ends my invention consists in the apparatus hereinafter described, an embodiment thereof being illustrated in the accompanying drawings, in which—

Figure I is a sectional elevation of the device. Fig. II is a horizontal section through the middle of Fig. I. Fig. III is a plan view.

The reference-letter $a$ indicates the shell of the filter, which is riveted to a top ring $b$, provided with supporting-brackets $c$ $c$ and a gasket $d$, of rubber or other suitable material. A top head $e$ is bolted thereto against said gasket, preferably by hinged bolts, and provided with an eyebolt, so that it can be readily lifted off, and an air-cock at 1. Resting upon a shoulder inside of the shell-ring $b$ is a deflecting-ring $f$, bolted to the upper edge of which is a screen of wire-cloth $g$ and a perforated plate $h$, with an extension of the head bearing against the center of said plate to prevent its bulging upward. A waste-pipe $i$ for carrying away wash-water and impurities leads out of the compartment above the perforated plate $h$ and has a suitable shut-off cock therein. To the bottom of the shell is riveted a funnel-shaped head $j$, having an opening in the bottom for discharging sand and provided with an inlet $k$ and an outlet $l$ for the liquid to be filtered and an annular shoulder in which is set a rubber gasket $m$. Made somewhat smaller in diameter than the inside of the shell and supported by suitable short legs $n$, resting upon the upper edge of the lower head $j$, is a funnel-shaped lining $o$ for supporting the sand with its lower edge bearing against the gasket $m$, thus forming an annular compartment $p$, sealed at the bottom, but having a narrow outlet around the top, between the small legs $n$, into which the liquid enters through the inlet $k$. Provided with short legs 12, superimposed upon each other and resting upon the lining $o$, is a column of hollow conical rings $q$ of somewhat smaller diameter than the inside of the shell, thereby leaving a narrow space between said rings and the shell, which is kept clear for the liquid to flow through as the sand takes its natural slope between the inside edges of said rings.

Fitted to the end of the outlet $l$, with its end bearing against a shoulder thereon, is a perforated tube $r$, standing upright concentric with the shell and provided with a cap $s$, fitted thereto, and also having a shoulder bearing against the end of the tube. A pipe $t$, concentric with said perforated tube, is screw-threaded through the extension of the outlet $l$ and projects through the cap $s$, having its upper end screw-threaded to receive a nut $u$, which serves to clamp said cap and perforated tube to the outlet $l$, thereby making a rigid structure which may be readily taken apart.

To the outside of the sand-discharging orifice in the bottom head $j$ is fitted a cover or valve $v$, having a suitable packing-ring and provided with trunnions journaled, respectively, in the ends of two lever-arms 2 and 3 of a swinging frame $w$, fulcrumed to the head at 4. To the outer end of said frame $w$ is hinged an eyebolt 5, provided with a nut 6, screw-threaded thereon, said nut having a round-ended pin 7 fixed thereto, adapted to engage a socket in the head, and a suitable hand-wheel for turning it, and thereby clamping the valve v against its seat. It being desired to discharge the sand from the filter, the nut 6 is loosened and disengaged from its socket, whereupon the valve v swings clear of the discharge-opening, as shown by dotted lines in Fig. I. Screw-threaded in the valve v, in line with the central pipe t, is a nozzle 8, having a thread and shoulder on its outer end suitable for attaching a hose-valve thereto.

9 is the inlet-valve for liquid to be filtered.

10 is a water-valve, and 11 is a valve for the admission of steam.

The valve 9 being closed, the chamber p, plates q, and shell of the filter may be cleaned by admitting water and steam through the valves 10 and 11 and opening the cock in the waste-pipe i; but to thoroughly cleanse the filtering material a jet of water is forced through the nozzle 8, breaking up the filtering-sand and carrying it, together with the impurities, up through the central pipe t, where they are thoroughly agitated and separated, and, overflowing from the top of said pipe, the sand falls back into the body of the filter, on account of its greater specific gravity, while the impurities, which are usually soft or fine, pass through the screen g and are carried away with the waste water through the pipe i. The screen g has a mesh close enough to prevent the escape of the filtering-sand.

Having described the application of my invention as above, what I claim as new, and desire to secure by Letters Patent, is—

1. In a filter of the class described, the combination with a suitable shell, a column of superimposed frames adapted to hold the filtering material out of contact with said shell, and means for admitting liquid between the filtering material and the shell, of the means for agitating the filtering material and separating the impurities therefrom comprising a vertical, open-ended pipe secured therein having its lower end inserted in said filtering material, and means for injecting a jet of water into the lower end of said pipe, substantially as set forth.

2. In a filter containing filtering material such as sand, the combination with a suitable shell, means for supporting the filtering material forming a clear space between said filtering material and the shell, and a suitable inlet connecting with said space, of a vertical, open-ended pipe fixed therein with its lower end embedded in said filtering material near the bottom of said filter and its upper end opening near the top of the filter, a nozzle set under said pipe in line therewith, and means for forcing a jet of water through said nozzle into said pipe, substantially as set forth.

3. In a filter of the class described, the combination with a suitable shell, and means for admitting liquid to be filtered between the filtering material and the shell, of an open-ended pipe set vertically therein with its lower end adapted to be embedded in the filtering material and its upper end reaching near the top of the filter, means for forcing a jet of water into the lower end of said pipe adapted to carry filtering material and impurities therethrough, a suitable screen secured above said pipe, and a waste-pipe leading out of the filter above said screen, substantially as set forth.

4. In a filter packed with granular filtering material, the combination with a suitable shell and means for admitting liquid to be filtered between the filtering material and the shell, of a vertical, perforated tube surrounded by filtering material, capped at both ends and provided with an outlet through the bottom cap, an open-ended pipe passing through said tube with its ends secured in and projecting through the caps thereof, means for forcing a jet of water into the lower end of said pipe adapted to carry filtering material and impurities therethrough, a suitable screen secured above said pipe, and a waste-pipe leading out of the filter above said screen, substantially as set forth.

5. In a filter of the class described, the combination with a suitable shell, a removable top head, a funnel-shaped bottom head having an orifice provided with a suitable cover for discharging the filtering material, and means for admitting liquid to be filtered, water or steam between the filtering material and the shell, of a vertical, perforated tube surrounded by filtering material, capped at both ends and provided with an outlet through the bottom cap, an open-ended pipe passing through said tube with its ends secured in and projecting through the caps thereof, an adjustable nozzle set in the cover of the orifice in the bottom head in line with said pipe and provided with means for injecting a jet of water therethrough, a suitable screen secured above said pipe, and a waste-pipe leading out of the filter above the screen, substantially as set forth.

In testimony whereof I affix my signature, in the presence of two subscribing witnesses, at Cleveland, Ohio, October 5, 1900.

EDWARD F. DYER.

Witnesses:
ELSIE M. HOPPER,
F. H. MOYER.